(12) United States Patent
Patterson

(10) Patent No.: US 7,165,240 B2
(45) Date of Patent: Jan. 16, 2007

(54) TOPOLOGICAL BEST MATCH NAMING CONVENTION APPARATUS AND METHOD FOR USE IN TESTING GRAPHICAL USER INTERFACES

(75) Inventor: Bret Patterson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/177,778

(22) Filed: Jun. 20, 2002

(65) Prior Publication Data

US 2003/0236775 A1 Dec. 25, 2003

(51) Int. Cl.
*G06F 3/00* (2006.01)
*G06F 9/44* (2006.01)

(52) U.S. Cl. .......................... 717/116; 706/20; 706/21; 706/47; 706/48; 715/768; 715/789; 715/810

(58) Field of Classification Search ................ 719/321; 700/245; 715/789, 768, 810; 717/116; 706/20–21, 706/47–48
See application file for complete search history.

(56) References Cited

U.S. PATENT DOCUMENTS

| | | | | |
|---|---|---|---|---|
| 5,640,537 | A | 6/1997 | Jessen et al. | 395/500 |
| 5,708,774 | A | 1/1998 | Boden | 395/183.14 |
| 5,774,725 | A | 6/1998 | Yadav et al. | 395/704 |
| 5,802,365 | A * | 9/1998 | Kathail et al. | 719/321 |
| 6,002,871 | A | 12/1999 | Duggan et al. | 395/704 |
| 6,192,512 | B1 | 2/2001 | Chess | 717/5 |
| 6,353,897 | B1 | 3/2002 | Nock et al. | 714/38 |

(Continued)

OTHER PUBLICATIONS

Mercury Interactive Corporation, "WinRunner 7.0 User's Guide", 2000, 1293 pages, 41 pages extracted Online version can be accessed at <http://www.wilsonmar.com/docs/wr70/wr¯ug.pdf>.*

(Continued)

*Primary Examiner*—Tuan Dam
*Assistant Examiner*—Thuy Dao
(74) *Attorney, Agent, or Firm*—Duke W. Yee; Jeffrey S. LaBaw; Betty Formby

(57) ABSTRACT

A topological best match naming convention apparatus and method for graphical user interface (GUI) testing are provided. With the apparatus and method, properties of the GUI object are recorded and stored in a GUI object database. During execution of test scripts, if a lookup of an GUI object's name to its runtime control fails, the present invention attempts to perform a match with the currently known objects. The matching mechanism is based on a comparison of the properties of the GUI object to properties of known GUI objects. With this mechanism, a predetermined set of properties is collected from the GUI object that is subject to the test script and for which the lookup of the runtime control failed. Each property of the known GUI objects in the GUI object database is assigned a weight based on the probability that a GUI object having a matching property is the same GUI object. Each property is checked for a match and if a match is identified, the corresponding weight is added to a total count kept for each correspondence. A correspondence between a GUI object and a known GUI object having a highest total weight is selected as a best candidate for use in determining the runtime control for the GUI object.

18 Claims, 4 Drawing Sheets

U.S. PATENT DOCUMENTS 6,434,447 B1 *  8/2002  Shteyn ........................ 700/245
6,707,476 B1 *  3/2004  Hochstedler ................ 715/789

OTHER PUBLICATIONS

Chip Jones, "Regular Expressions in Java", Oct. 2001, 7 pages. Online version can be accessed at <http://www.ociweb.com/jnb/jnbOct2001.html>.*

David Eppstein, "Hashing and Move Ordering", Spring 1997, 3 pages. Online version can be accessed at <http://www.ics.uci.edu/~eppstein/180a/970424.html>.*

Mercury Interactive Corporation, "WinRunner 7.0 User's Guide", 2000, 1293 pages, 66 pages extracted.*

* cited by examiner

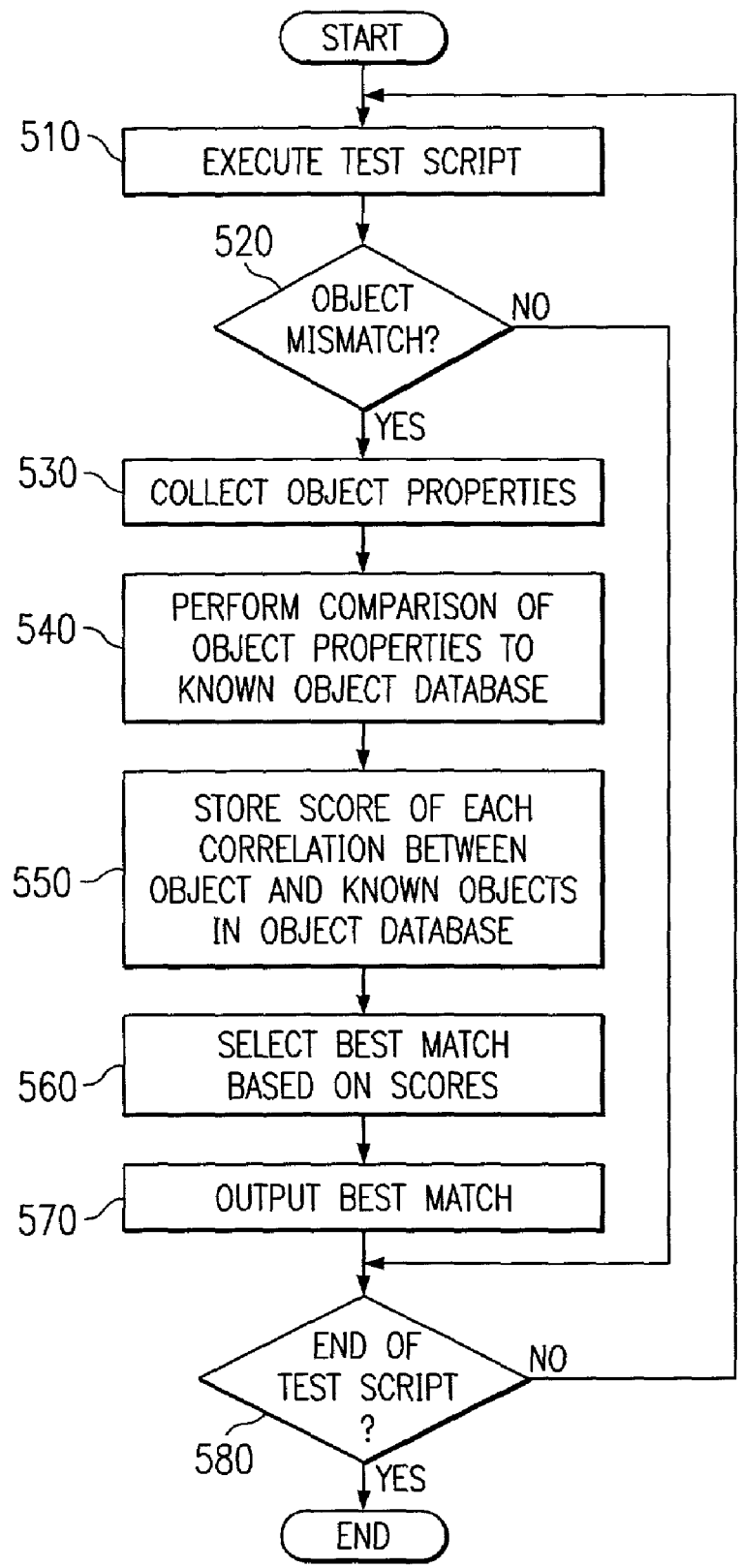

TOPOLOGICAL BEST MATCH NAMING CONVENTION APPARATUS AND METHOD FOR USE IN TESTING GRAPHICAL USER INTERFACES

BACKGROUND OF THE INVENTION

1. Technical Field

The present invention is generally directed to an improved computing system. More specifically, the present invention is directed to a topological best match naming convention apparatus and method for use in testing graphical user interfaces.

2. Description of Related Art

To ensure that applications perform and operate as expected, they need to be tested prior to release. Such testing involves the adoption of a test management strategy followed by the performance of load testing and functional testing on the applications. Load testing involves the emulation of multiple users interacting with an application infrastructure to ascertain where any bottlenecks may exist. Functional testing involves automatically capturing, verifying and replaying user interactions to determine if the applications function as expected.

A known mechanism for performing functional tests on applications is the WinRunner program available from Mercury Interactive. With the WinRunner program, test scripts are generated by recording a user's interaction with a particular version of an application's graphical user interface (GUI). The recording is then later replayed to test the application, or other versions of the application, with different data sets. Reports are generated indicating the events occurring during the test and any errors that may occur.

The most difficult problem for a GUI test harness, e.g., the tool (e.g., WinRunner) used to run a group of test scripts to test the functionality of the GUI, is being able to generate a unique and repeatable name (from build to build and run to run) that the user can use to identify which GUI components the user wishes to inspect or manipulate. The problem lies in that not every control has something unique about it that does not vary from run to run or is guaranteed to not change in the next build. Thus, for example, if a test script is recorded for version 1.00 of a GUI application and the test script is then used to verify the functionality of version 1.05 of the GUI application, the GUI objects present in version 1.00 may not be present in version 1.05 or may be in different locations from the version with which the test script was generated.

For example, assume that a graphical user interface consists of five buttons and the test case calls for the selection of the fourth button. This seems to be a straight forward test situation. However, what happens when the order of the buttons changes between the time the test case is written and the time that it is actually implemented? Now it is not certain which button should be selected. This is because the control that is intended to be invoked through the selection of the fourth button will now not be invoked if the fourth button is selected in the modified GUI. In other words, the control that is intended to be invoked is independent of the GUI object's location and its surroundings.

Thus, it would be beneficial to have an apparatus and method that is capable of uniquely identifying the control desired by a GUI test script even if the build of the GUI application has been modified from when the test script was generated.

SUMMARY OF THE INVENTION

The present invention provides a topological best match naming convention apparatus and method for graphical user interface (GUI) test harnesses. With the apparatus and method of the present invention, properties of the GUI object are recorded and stored in a GUI object database. During execution of the test scripts, if a lookup of a GUI object's name to its runtime control fails, the present invention attempts to perform a match with the currently known objects.

The matching mechanism of the present invention is based on a comparison of the properties of the GUI object to properties of known GUI objects, e.g., GUI objects present at the time the test script is executed. With this mechanism, a predetermined set of properties is collected from the GUI object that is subject to the test script. These properties are then compared against the properties of the known GUI objects in the GUI object database. Each property of the known GUI objects in the GUI object database is assigned a weight based on the probability that a GUI object having a matching property is the same GUI object.

Each property is checked for a match and if a match is identified, the corresponding weight is added to a total count kept for each correspondence between the GUI object and each known GUI object in the GUI object database. A correspondence between a GUI object and a known GUI object having a highest total weight is selected as a best candidate for use in determining the runtime control for the GUI object. Thereafter, the runtime control corresponding to the matching known GUI object may be invoked as part of the continued execution of the test script.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart outlining an exemplary operation of the present invention.

DETAILED DESCRIPTION OF THE PREFERRED EMBODIMENT

Figure 1:
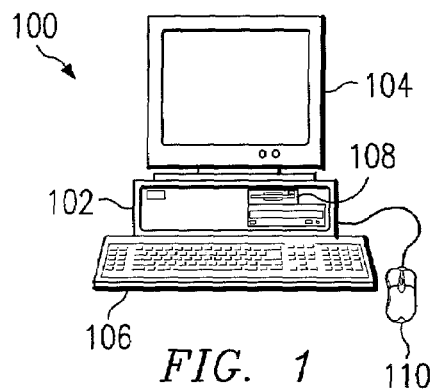
FIG. 1 is a pictorial diagram of a data processing system in which the present invention may be implemented.
Figure 2:
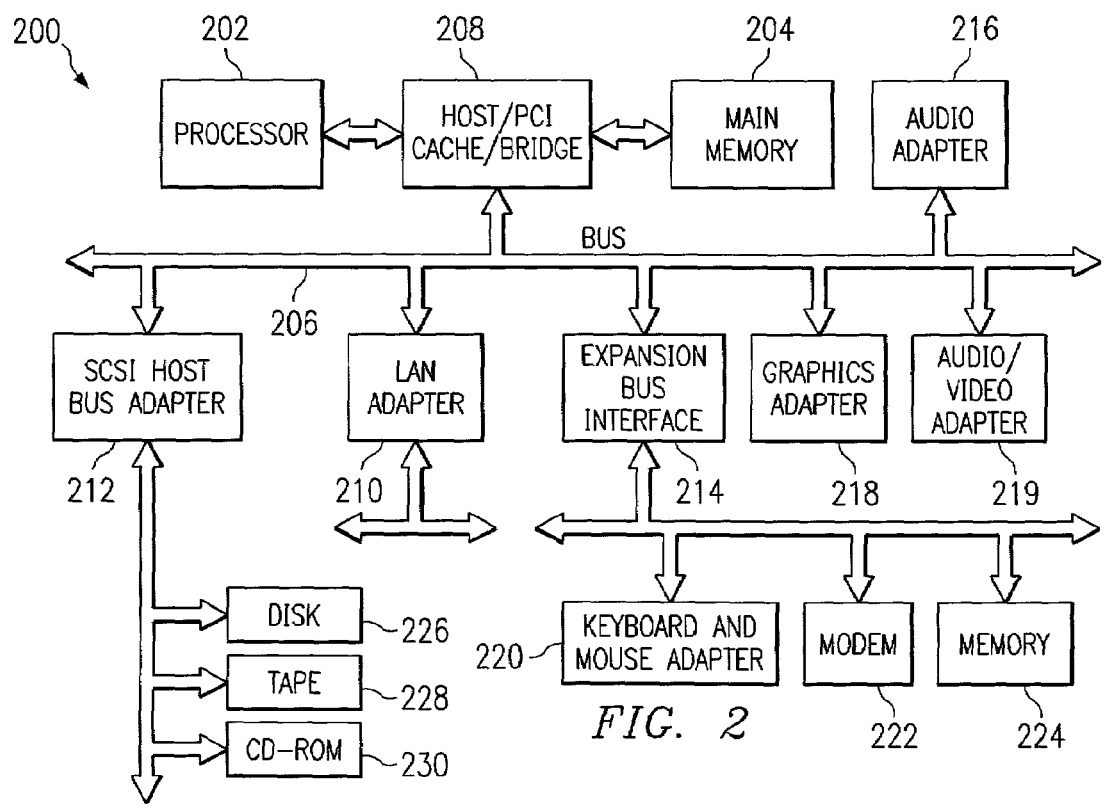
FIG. 2 is an exemplary block diagram of a data processing system in which the present invention may be implemented.

The present invention provides a topological best match naming convention apparatus and method for graphical user interface (GUI) test harnesses. The present invention may be implemented in any known or later developed computing system. FIGS. 1 and 2 are provided as an exemplary computing system in which the present invention may be implemented. However, FIGS. 1 and 2 are not intended to imply any limitation as to the computing systems on which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y.

Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP. Windows XP is a trademark of Microsoft Corporation and is available from Microsoft Corporation. An object oriented programming system such as Java may run in conjunction with the operating system and provides calls to the operating system from Java programs or applications executing on data processing system 200.

"Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

As mentioned above, the present invention provides a mechanism for performing a topological best match naming convention with regard to graphical user interface (GUI) objects and their underlying control functionality. The present invention works with GUI test scripts to provide correct identification of a control intended to be initiated by the manipulation of GUI objects. Based on this identification of the correct control, a test script generated using a first version of a GUI may be run on a subsequent versions of the GUI without error due to the differences in the location of GUI objects.

Figure 3:
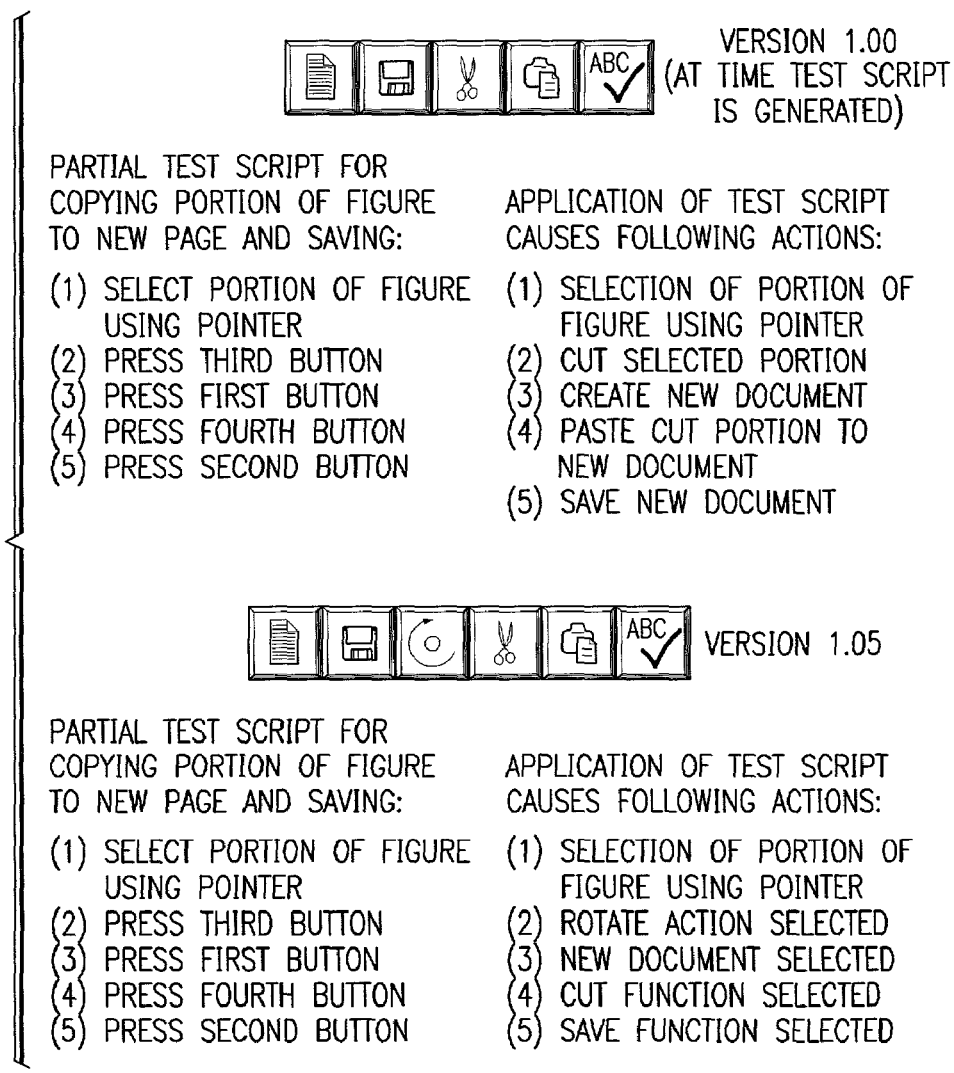
FIG. 3 is an exemplary diagram illustrating a the problem of matching GUI objects with runtime control when the GUI has been modified.

FIG. 3 illustrates the problems associated with known test scripts when GUIs are modified and the same test script is attempted on the modified GUI. Such scenarios often arise with new versions of applications. Typically, between coding and verification of an application, the version of the application may change. The test scripts generated during coding may not correspond with the actual version sent for verification. Thus, a mismatch between the test script and the version of the GUI is present and errors or failures will be identified during the verification.

As shown in FIG. 3, a first version of an applications GUI 300 includes a plurality of virtual buttons 310–350 for manipulation by a user to cause various application functions to occur. The virtual button 310 is a "new document" button which is used to create a new blank document for editing. The virtual button 320 is a "save" button that is used to store the current document to a storage location of a permanent storage device. The virtual button 330 is a "cut"

button which is used to cut a selected portion of a currently active document and temporarily store the selected portion in a clipboard application for later use with the paste function. The virtual button 340 is a "paste" button that is used to insert the contents of the clipboard into the currently active document at the current cursor position. The virtual button 350 is a "spell check" button that is used to perform a spell check function on the text of the currently active document.

With this version 1.00 of the application and GUI 300, a test script is recorded by recording a user's manipulation of the GUI 300. In the depicted example, the test script is used to test the application and GUI's ability to copy a portion of a document to a new document and save the new document having the copied portion. The exemplary portion of the test script includes the steps of (1) selecting a portion of the currently active document; (2) pressing the third button 330 of the GUI 300 to cause the selected portion to be cut; (3) pressing the first button 310 to create a new document for editing; (4) pressing the fourth button 340 to paste the cut portion of the document into the new document; and (5) pressing the second button 320 to store the new document having the selected portion of the document inserted.

The bottom portion of FIG. 3 illustrates a modified version of the GUI 300. Version 1.05 of the application and GUI is a modification of version 1.00 that is assumed to have been developed sometime between creation of the test script and verification of the application and GUI using the test script.

As shown in FIG. 3, the modified version 1.05 of the GUI includes the virtual buttons 310–350 but also includes an additional virtual button 360 between virtual buttons 320 and 330. Because of this change in the GUI 300, the test script will not result in a correct operation of the application and GUI.

If the test script that was generated using version 1.00 of the application and GUI is applied to the modified version 1.05 of the application and GUI, a completely different result is obtained from that of version 1.00. Applying the test script to the version 1.05 of the GUI results in (1) selection of a portion of a document; (2) pressing of the third button 360 which causes the selected portion of the document to be rotated; (3) pressing of the first button 310 which causes a new document to be created; (4) pressing a fourth button 330 which causes a selected portion of the new document to be cut (this function may not actually be selectable since there is no selection of a portion of the new document before selection of the cut button 330); and (5) pressing of the second button causing the blank new document to be saved. Thus, in one case, a document having a selected portion of a previous document is generated and in the other, a blank document is generated.

It is clear from the above example, that any change to a graphical user interface after generation of a test script may cause the test script to no longer be applicable. As a result, in the prior art, new test scripts must be generated for each new version of an application and GUI. The present invention seeks to alleviate this problem as well as provide a robust mechanism for allowing previously generated test scripts to be applied to newer versions of an application and GUI.

The present invention provides a topological best match naming convention apparatus and method for graphical user interface (GUI) test harnesses. With the apparatus and method of the present invention, properties of GUI objects are recorded and stored in a GUI object database. During execution of the test scripts, if a lookup of a GUI object's name to its runtime control fails, the present invention attempts to perform a match with the currently known objects for the particular GUI application. That is, when a test script is executed, a GUI object's name, i.e. the string name a test script uses to uniquely identify an object that should be present at this point in the applications execution, needs to be converted from this test script friendly name (e.g., a simple string representation of the objects properties) to the actual physical object that is located in the computer's memory that contains the logic for what happens when users perform specific actions on it (e.g., the location in "memory" of a virtual button to be pressed). If this conversion fails, the present invention is implemented to determine the most likely intended correspondence between the GUI object in the test script and the actual physical object in memory.

With the present invention, there are essentially two GUI object databases utilized. A first GUI object database, the runtime GUI object database, is essentially a mapping of the current running application's objects to a Property object that can be readily turned into a GUI object "name", i.e. take the properties and combine them to form a string. The second GUI object database, which is created during test script creation, is essentially the string representation of all the objects the user will manipulate within this test script, converted to their string names and placed throughout the test script at the place where they will be used, i.e. in this situation the second GUI object database is essentially built up of the names for each action the script performs. For example, a string representation of a GUI object manipulated within the test script may take the form PushButton ("{3}{JButton}{File}{1}{2}{3}}") or PushButton{"{3}{JButton}{Open}{2}{1}{3}"}.

As shown above, each operation that is contained in the test script has a "name" for the object it wishes to manipulate, this "name" happens to be the set of properties extracted from the object during test script execution expanded into a easily parsed format that can be broken apart again into the properties if an exact match of this name to the runtime object's "name" fails.

In ideal circumstances the runtime GUI object database contains every single GUI object the user may interact with at this point in time, with a "GeneratedName" pointing to the actual object the program is using. The test script's "Name" is then compared to all the "GeneratedNames" to determine if there is an exact match. If there is an exact match, the actual GUI object pointed to by the GeneratedName is used to perform the desired operation. If an exact match is not found, i.e. the lookup of the GUI object's name to its runtime control fails, then the present invention breaks up the test script's "Name" for the GUI object into it's properties and every other GeneratedName into it's properties and finds a best match.

With the present invention, a hashtable may be used to perform the lookup of the GUI object's name to its runtime control so that a virtually instant result as to whether there is an exact match can be obtained without having to search through all GUI object "GenerateName" in the runtime GUI object database. If there is not an exact match, the matching mechanism of the present invention is employed to identified a best match candidate for the runtime control.

The matching mechanism of the present invention is based on a comparison of the properties of the GUI object to properties of known GUI objects in the runtime GUI object database, e.g., GUI objects being used by the GUI application that is the subject of the test scripts. With this mechanism, a predetermined set of properties is identified for the GUI object that is subject to the test script and for which the lookup of the runtime control has failed. These properties are then compared against the properties of the known GUI objects in the runtime GUI object database. Each property of the known GUI objects in the runtime GUI object database is assigned a weight based on the probability that a GUI object having a matching property is the same GUI object.

Each property is checked for a match and if a match is identified, the corresponding weight is added to a total count or score kept for each correspondence between the GUI object and each known GUI object in the GUI object database. A correspondence between a GUI object and a known GUI object having a highest total count or score is selected as a best candidate for use in determining the runtime control for the GUI object. Thereafter, the runtime control corresponding to the matching known GUI object may be invoked as part of the continued execution of the test script.

In a preferred embodiment of the present invention, the properties stored for each GUI object are used to uniquely identify the GUI object and its corresponding runtime control. These properties include, for example, the naming convention version number (a number that identifies which of a plurality of naming/matching algorithms are to be used), the object's generic classname, any label (text if present) that may be associated with the object, the height of the object in the object's container, the index number of the object that identifies the object's place in its parent's container, and an ID number that is incremented if the first five properties all are equal to another runtime control object.

A container is an object that has one ability, possibly among other abilities, which is to contain references to other objects. The container then can be set to apply certain operations upon the objects it contains. For example, a container can be told to draw the objects it contains from left to right with a 1 inch gap between them, or vertically with a 1 inch gap, or another desired operation. A container's sole purpose is to apply specific rules to objects you "place" within it.

Containers can be contained within other containers. In this manner a set of rules can be applied as from container to container. As you get deeper down in the container, each object's rule set is in essence a set of all the rules of all the containers that are "above" it. Thus, a container may be a parent of another container.

The index into a container is an identifier of a location within the container. For example, assume a container that contains objects for 8 GUI virtual buttons, e.g., a button bar similar to the following:

| 0 | 1 | 2 | 3 | 4 | 5 | 6 | 7 |
|---|---|---|---|---|---|---|---|

The index is the location inside the container that the button has been stored as, e.g., the third button in the above example would have an index of 2.

Once these properties are collected for an object, a unique string representation of the object is generated that will be used to reference this object. This is the name that the user will actually use to refer to the object within the test script. In other words, when a test case is written, the user that creates the test case uses a "name" for the object that they wish to perform an operation on. In simplistic terms this can be something like "Ok" for a button that has a Label on it with text "Ok". In reality the string must be complex because their may be multiple buttons present in the GUI with the label "Ok". Therefore, if a user test case includes the requirement to push the "Ok" button, it is not possible to know which "Ok" button the user intends to be pushed.

In a preferred embodiment, in order to obtain a complex and unique name for each GUI object, a Component.getName( ) method is first run on the GUI object. If the Component.getName( ) method, i.e. the method used to extract the name assigned to a GUI object, does not return null, the value returned is used as the unique script reference for the object. Otherwise, if Component.getName( ) returns null, i.e. the developers of the GUI did not assign a unique name to the GUI object, a unique string reference, or name, is generated for the GUI object. This unique name is a string that contains a predetermined set of properties of that GUI object. The properties of the GUI object in the unique name are organized such that it is easy to extract the property names from the string name for the GUI object.

In an exemplary embodiment, the following algorithm may be used to generate a unique string reference, or name, for the object:

(1) append naming convention version;

(2) append the object's classname;

(2) append the label of the object (if there is no label or the label is a graphic then the label portion is left blank);

(3) append a depth identifier of the depth of the object in the object container;

(4) append the index of the object within the parent's container; and (5) if the name is still not unique, then append the unique ID number. A determination as to whether the name is still not unique may be made by creating a temporary "name" for the GUI object using the properties collect so far and checking if a GUI object in the known GUI object database already has this name assigned to it. If so the temporary name is not unique and needs something appended to the name to make it unique. An 0 may be added to the end of the temporary name as the ID and then the check may be performed again. With each iteration, the ID may be incremented until a unique temporary name is identified. The unique temporary name may the be stored as the unique name for that GUI object.

The resulting unique string reference has the format: {{$version}{$classname}{$label}{$depth}{$index}{$ID}}

For example, a unique name for a GUI object make look like {{3}{JButton}{Ok}{−1}{1}{3}} indicating that the version is 3, the classname is Jbutton, the label is "Ok", the depth is −1, the index is 1 and the unique ID number is 3.

During execution, the GUI application creates the runtime GUI object database on the fly as the application is creating new user interface components. When the test script is executed on the GUI application, both of which are running at the same time, the "name" of the object the user wishes to manipulate, i.e. the object identified in the test script, is converted into a format comparable to the runtime GUI object database. The object name is then looked up in the runtime GUI object database.

In a preferred embodiment, a hashtable of the object references for all runtime GUI objects is generated. Whenever the user wishes to work with a specified object, an attempt is made to see if a direct name lookup of the test script GUI object in the hashtable maps to a runtime GUI object. In the case that the lookup fails, the topological best match mechanism of the present invention is implemented to identify a closest match for the object.

A comparison is then performed between the properties of the object failing the direct name lookup and the properties of all of the known GUI objects in the Runtime GUI object database. If a property match is identified, a count or score for the correlation between the object failing the direct name lookup and the known GUI object is incremented by a weight of that property. With the topological best match mechanism of the present invention, each GUI object property is assigned a user configurable weight. The stronger the weight the higher the probability that any object containing a value equal to it is the same object.

Once the comparisons are completed, a final user configurable reverse weight is applied at the end based on whether the GUI object's isShowing( ) method returns true or false. The isShowing( ) method is part of all GUI objects and returns true if the GUI object is currently visible by the user and false if the GUI object is not visible to the user.

If the isShowing( ) method returns false, then the count or score for the correlation between the GUI object and the known GUI object is decremented by the specified amount signifying that the GUI object is not currently visible to the user and thus, it should be given lower weight than other visible GUI objects. The correlation having the highest count or score is identified as the closest matching known GUI object. This known GUI object, i.e. its unique string reference, may then be used to identify the proper runtime control for the GUI object that failed the direct name lookup.

Figure 4:
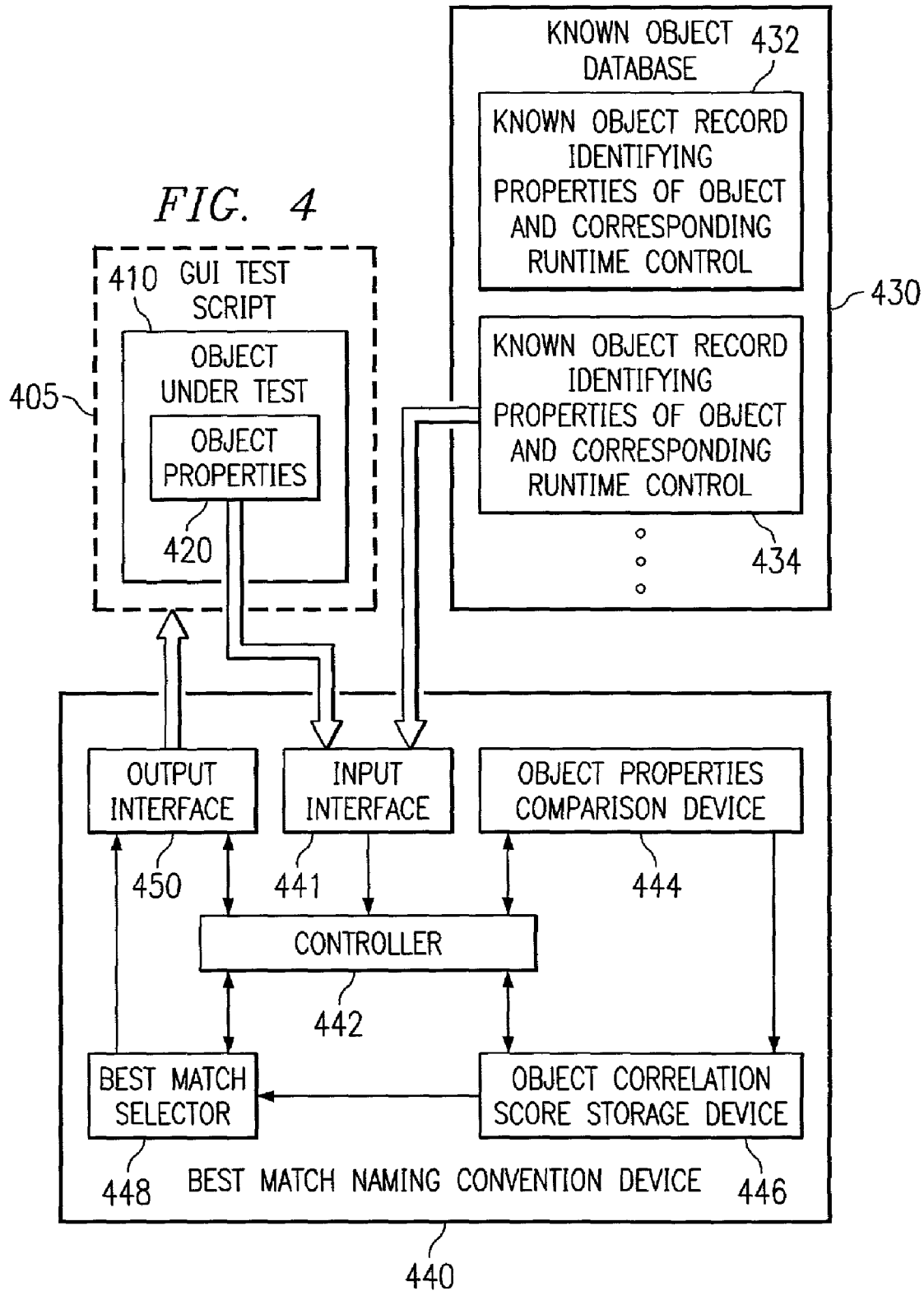
FIG. 4 is an exemplary diagram illustrating the operation of the present invention.

FIG. 4 is an exemplary block diagram illustrating the primary operational components of the present invention. The components shown in FIG. 4 may be implemented in software, hardware, or any combination of software and hardware. In a preferred embodiment, the components shown in FIG. 4 are implemented as software instructions executed by one or more processors.

As shown in FIG. 4, a GUI test script 405 is used to test an application and its GUI which includes the CUI object under test 410. This GUI object has properties 420 which are used by the present invention to perform a topological best match with known GUI objects.

As mentioned previously, when a direct name lookup fails, the topological best name match mechanism of the present invention is implemented to identify a closest match from the database of known GUI objects. The controller 442 retrieves the object properties 420 for the object under test 410 that failed the direct name lookup and also retrieves the known object information from the known object database 430, via input interface 441. The controller 442 provides these properties 420 and known object information to the object properties comparison device 444. The controller 442 also controls and orchestrates other operations and interactions of the components 444–450.

The object properties comparison device 444 compares the properties 420 to the properties of the known GUI objects obtained from the GUI object database 430. The scores for the various correlations between the object under test 410 and the known GUI objects generated from these comparisons is temporarily stored in the object correlation score storage device 446.

These scores are then provided to the best match selector 448 which selects a best match as being the correlation having a highest score. Of course, other ways of generating scores for correlations may be used and, with such other mechanisms, the highest score may not necessarily identify the closest match. A lowest score, score closest to a predetermined value, etc. may be used in place of the highest score depending on the particular implementation of the present invention.

The closest match is then output, via output interface 450, to the GUI test script 405 for use in identifying the runtime control for the object under test 410. The runtime control will be the runtime control associated with the closest match known GUI object. This runtime control may then be used for the remainder of the test.

FIG. 5 is a flowchart outlining an exemplary operation of the present invention. As shown in FIG. 5, the operation starts with the execution of a test script (step 510). A determination is made as to whether a direct lookup of a GUI object fails, i.e. there is a mismatch (step 520). If so, the GUI object's properties are collected (step 530). In order to collect the GUI object's properties, the name for the GUI object in the test script is deconstructed to identify the properties that make up the GUI object's name. A comparison is then performed between the object properties and known object properties in the known object database (step 540).

The score for each correlation between the object and known objects in the known object database are stored (step 550). A best match is then selected based on the stored scores (step 560). The best match is then output to the test script for use in identifying the runtime control for the object that failed the direct name lookup (step 570). A determination is made as to whether the end of the test script is encountered (Step 580) if so, the operation ends. Otherwise, the operation returns to step 510.

Thus, the present invention provides a mechanism for identifying a best match known GUI object when a direct name lookup of a GUI object fails. The present invention allows test scripts that have been generated for different versions to be used regardless of the particular version currently under test. With the present invention, if a test script references an object whose runtime control cannot be identified by a direct name lookup, the best match may be identified to thereby identify the intended runtime control.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Various optimizations for implementing the matching mechanism of the present invention may be utilized. For example, it is not necessary to compare all of the known GUI objects to the GUI object in the test script to find a closest match unless there is a direct failure. The use of hashtables allows a fixed operation delay to be used to find out if there is an exact match.

Additionally, the runtime GUI object database of the running application may be stored in two forms:

1. Generated String name which points to the actual object in a hastable;

2. A Vector (i.e. list of all GUI objects) that lists all the generated string names for runtime GUI objects in an already broken down form such that the string names are broken into property names and each generated string name also points to their respective object.

By storing the known GUI object database in these two formats, a nearly instant determination regarding exact matches may be obtained by doing a hashtable lookup of the test scripts object name to check for an exact match, which happens most of the time. However if this exact match fails, then a search through all the known GUI objects may be performed and a match quickly identified, thereby minimizing the delay in finding the right runtime control object.

The embodiments described above were chosen and described in order to best explain the principles of the invention, the practical application, and to enable others of ordinary skill in the art to understand the invention for various embodiments with various modifications as are suited to the particular use contemplated.

What is claimed is:

1. A method of identifying a runtime control for a graphical user interface (GUI) object, comprising the computer-implemented steps:

determining if an exact match for the GUI object is found among runtime-GUI objects; and if an exact match is not found, identifying a first set of properties of the GUI object, retrieving a respective set of runtime properties for each of a plurality of runtime GUI objects in the runtime GUI object database, assigning a score to each of the plurality of runtime GUI objects according to the correspondence between the respective set of runtime properties and the first set of properties, identifying a best match runtime GUI object as the runtime GUI object having the highest score, and using the runtime control associated with the best match runtime GUI object when operations on the GUI object are performed.

2. The method of claim 1, wherein the GUI object is a GUI object referenced by a test script.

3. The method of claim 1, wherein the runtime GUI object database is generated by a GUI application.

4. The method of claim 1, wherein identifying the first set of properties of the GUI object includes deconstructing a string reference for the GUI object into one or more parts, each part identifying a property of the GUI object.

5. The method of claim 1, wherein retrieving a respective set of properties includes deconstructing a respective string reference for each of the plurality of runtime GUI objects into one or more parts, each part identifying a property of the respective runtime GUI object.

6. The method of claim 1, wherein assigning a score to each of the plurality of runtime GUI objects includes:

determining which ones of the first set of properties matches which ones of the respective set of runtime properties of a respective runtime GUI object; and modifying a score for the respective runtime GUI object based on weights associated with each of the first set of properties that match the respective set of runtime properties of the respective runtime GUI object.

7. The method of claim 1, further comprising:

generating a unique string reference for each of the plurality of runtime GUI objects based on the respective set of runtime properties; and generating a unique string reference for the GUI object based on the first set of properties.

8. The method of claim 1, wherein said determining step comprises performing a lookup of a string reference for the GUI object in a hashtable.

9. The method of claim 1, wherein the first set of first properties and the respective set of runtime properties for each of the plurality of runtime objects include one or more of a naming convention version number, a corresponding object's generic classname, a corresponding object's label, a height of the corresponding object in the corresponding object's container, an index number of the corresponding object in the corresponding object's container, and an identification number.

10. An apparatus for identifying a runtime control for a graphical user interface (GUI) object, comprising:

determining means for determining if an exact match for the GUI object is found among runtime-GUI objects;

first identifying means for identifying a first set of properties of the GUI object;

retrieving means for retrieving a respective set of runtime properties for each of a plurality of runtime GUI objects in the runtime GUI object database;

assigning means for assigning a score to each of the plurality of runtime GUI objects according to the correspondence between the respective set of runtime properties and the first set of properties;

second identifying means for identifying a best match runtime GUI object as the runtime GUI object having the highest score; and control means for using the runtime control associated with the best match runtime GUI object when operations on the GUI object are performed, wherein said first identifying means, said retrieving means said assigning means, said second identifying means, and said control means are activated only if said determining means do not find an exact match.

11. The apparatus of claim 10, wherein the GUI object is a GUI object referenced by a test script.

12. The apparatus of claim 10, wherein the runtime GUI object database is generated by a GUI application.

13. The apparatus of claim 10, wherein the means for identifying the first set of properties of the GUI object includes means for deconstructing a string reference for the GUI object into one or more parts, each part identifying a property of the GUI object.

14. The apparatus of claim 10, wherein the means for retrieving a respective set of properties includes means for deconstructing a respective string reference for each of the plurality of runtime GUI objects into one or more parts, each part identifying a property of the respective runtime GUI object.

15. The apparatus of claim 10, wherein assigning a score to each of the plurality of runtime GUI objects includes:

means for determining which ones of the first set of properties matches which ones of the respective set of runtime properties of a respective runtime GUI object; and means for modifying a score for the respective runtime GUI object based on weights associated with the first set of properties that match the respective set of runtime properties of the respective runtime GUI object.

16. The apparatus of claim 10, further comprising:

means for generating a unique string reference for each of the plurality of runtime GUI objects based on the respective set of runtime properties; and means for generating a unique string reference for the GUI object based on the first set of properties.

17. The apparatus of claim 10, wherein said determining means comprises means for performing a lookup of a string reference for the GUI object in a hashtable.

18. The apparatus of claim 10, wherein the first set of properties and the respective set of runtime properties for each of the plurality of runtime objects include one or more of a naming convention version number, a corresponding object's generic classname, a corresponding object's label, a height of the corresponding object in the corresponding object's container, an index number of the corresponding object in the corresponding object's container, and an identification number.

* * * * *